April 24, 1934.  C. M. YODER  1,955,783
APPARATUS FOR SIZING AND STRAIGHTENING HOLLOW BODIES
Filed Sept. 19, 1931  14 Sheets-Sheet 1

INVENTOR
Carl M. Yoder
BY Geo. B. Pitts
ATTORNEY

April 24, 1934.    C. M. YODER    1,955,783
APPARATUS FOR SIZING AND STRAIGHTENING HOLLOW BODIES
Filed Sept. 19, 1931    14 Sheets-Sheet 2
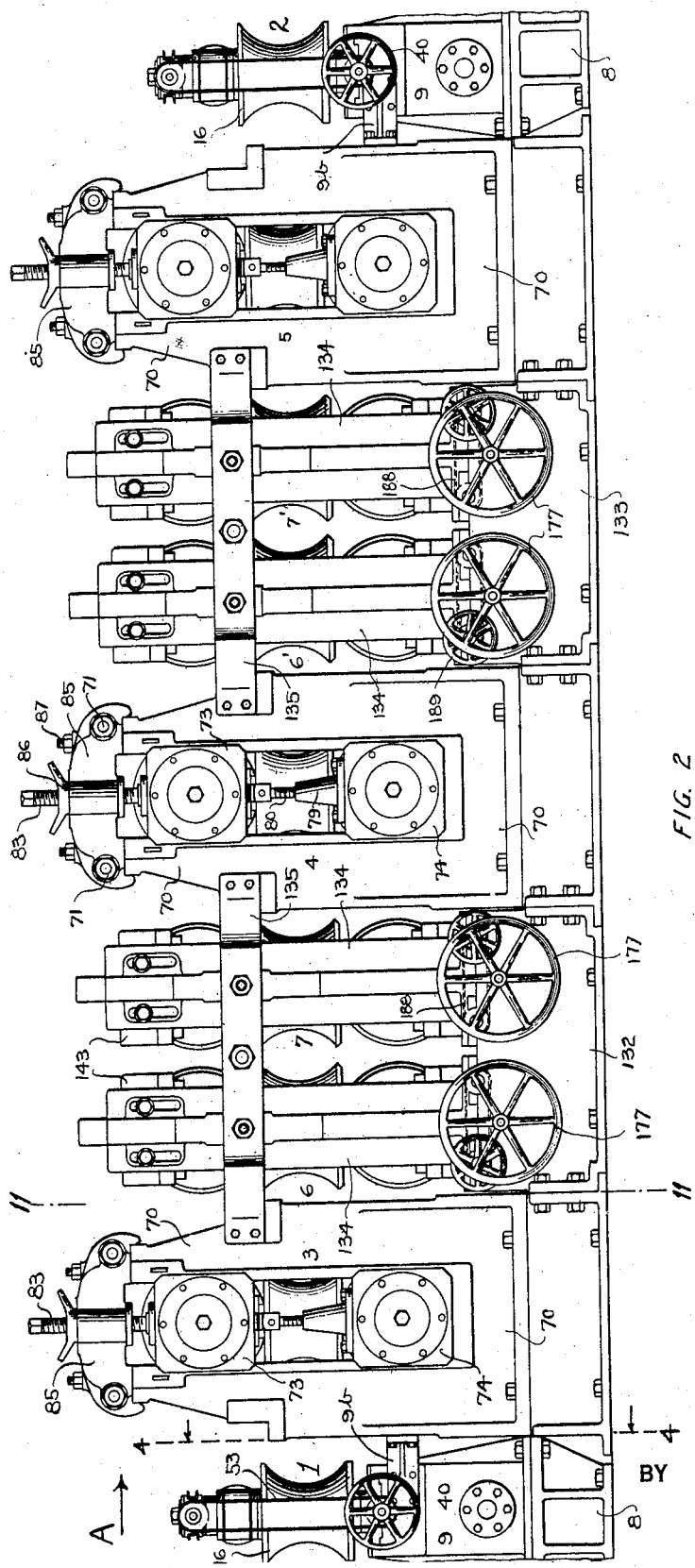
INVENTOR
Carl M. Yoder
Geo. B Fitts
BY
ATTORNEY

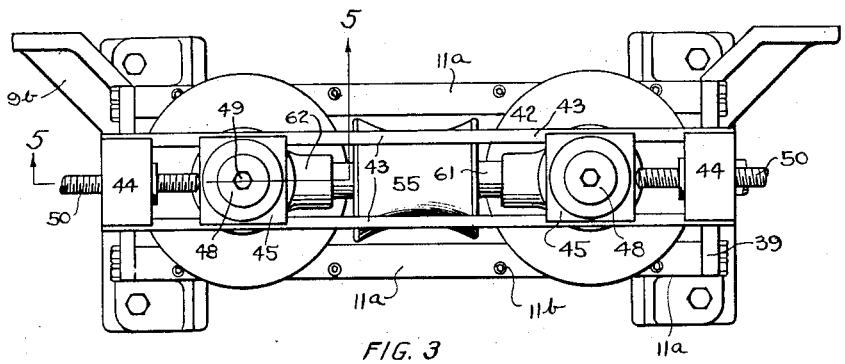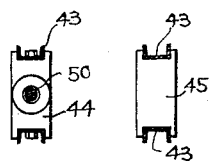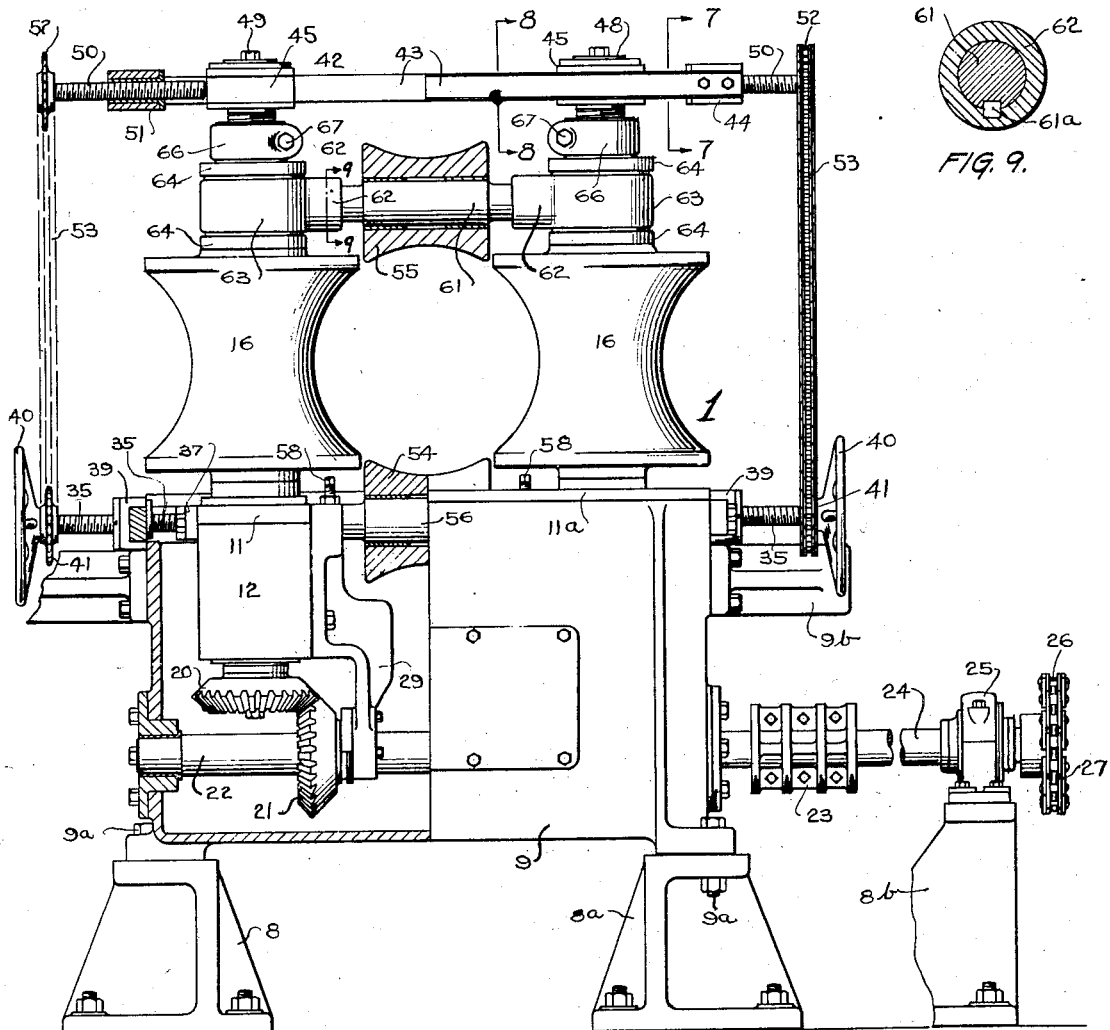

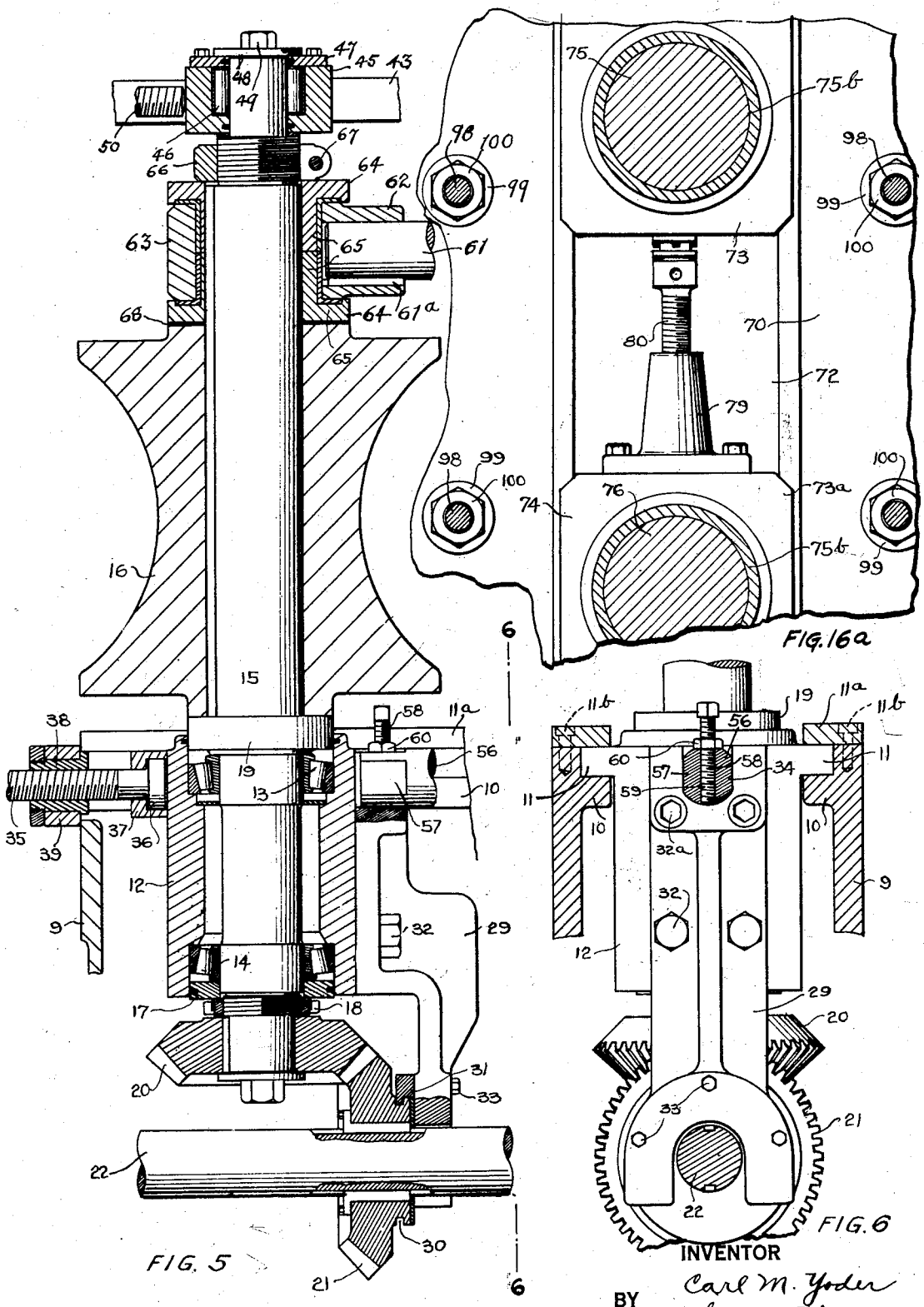

April 24, 1934.  C. M. YODER  1,955,783
APPARATUS FOR SIZING AND STRAIGHTENING HOLLOW BODIES
Filed Sept. 19, 1931  14 Sheets-Sheet 5
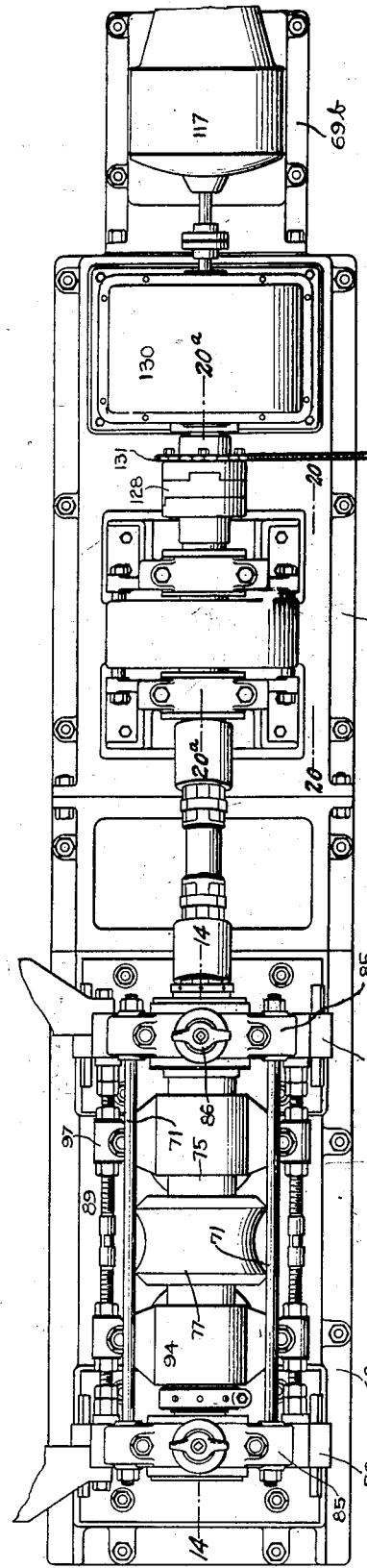
INVENTOR
BY Carl M Yoder
Geo. B Pitts
ATTORNEY April 24, 1934.  C. M. YODER  1,955,783
APPARATUS FOR SIZING AND STRAIGHTENING HOLLOW BODIES
Filed Sept. 19, 1931  14 Sheets-Sheet 6
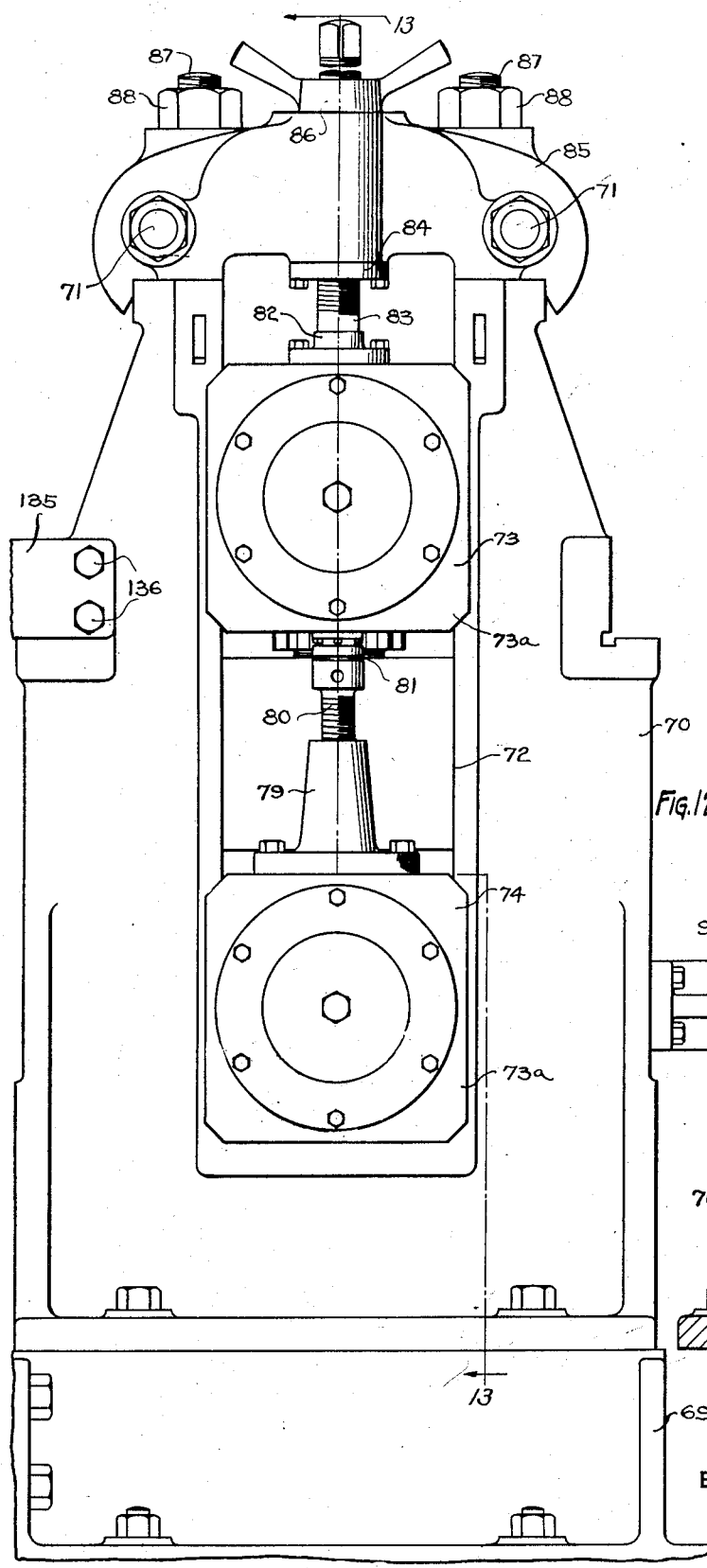
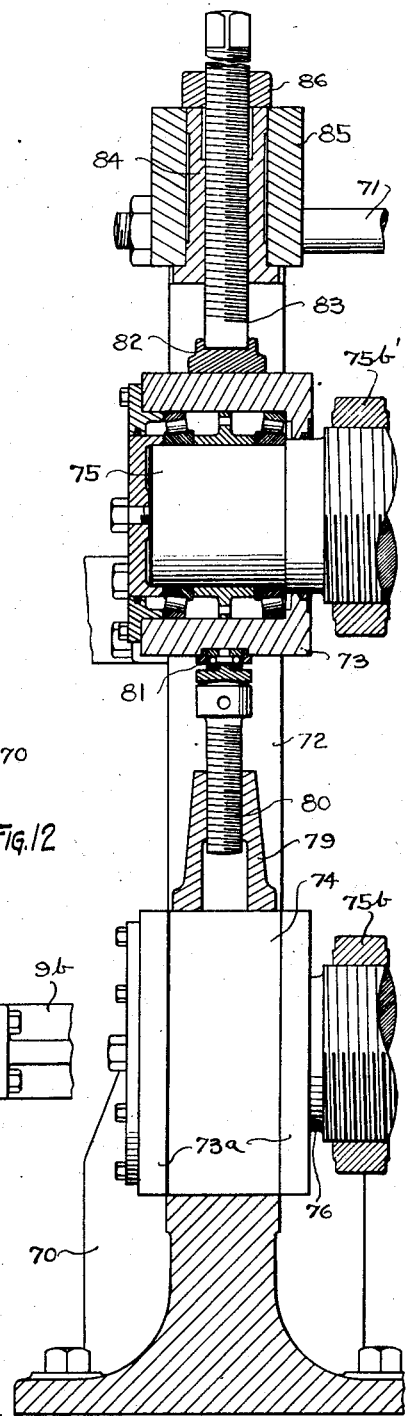
INVENTOR
Carl M. Yoder
Geo. B. Pitts
BY
ATTORNEY

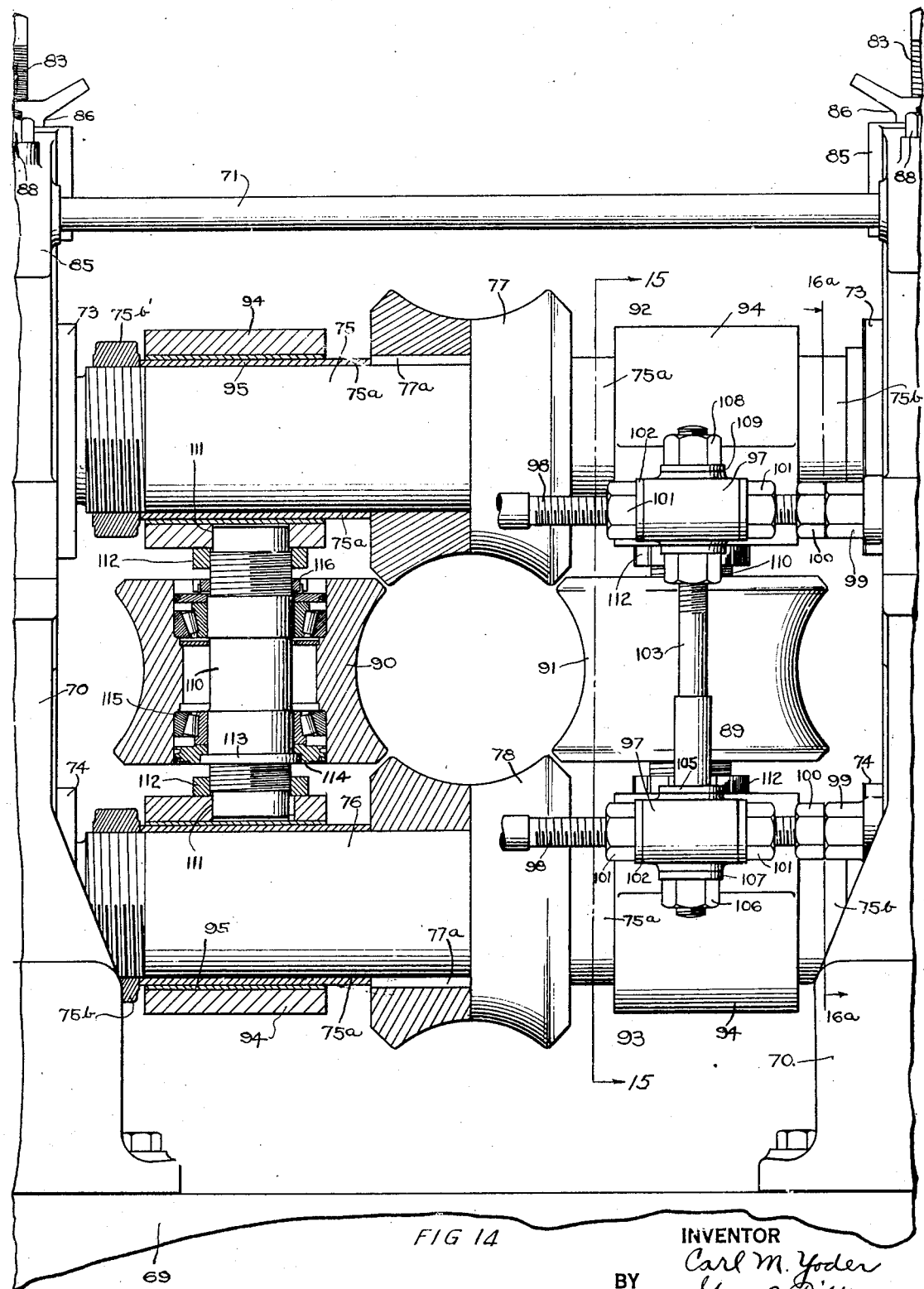

April 24, 1934.　　　　　C. M. YODER　　　　　1,955,783

APPARATUS FOR SIZING AND STRAIGHTENING HOLLOW BODIES

Filed Sept. 19, 1931　　14 Sheets-Sheet 8

INVENTOR
Carl M. Yoder
BY Geo. B. Pitts
ATTORNEY

April 24, 1934.  C. M. YODER  1,955,783
APPARATUS FOR SIZING AND STRAIGHTENING HOLLOW BODIES
Filed Sept. 19, 1931  14 Sheets-Sheet 9
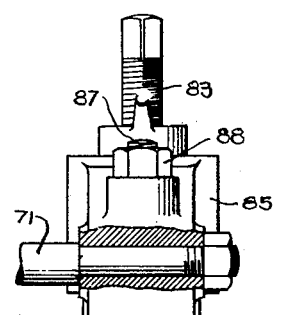
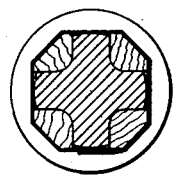
FIG 18
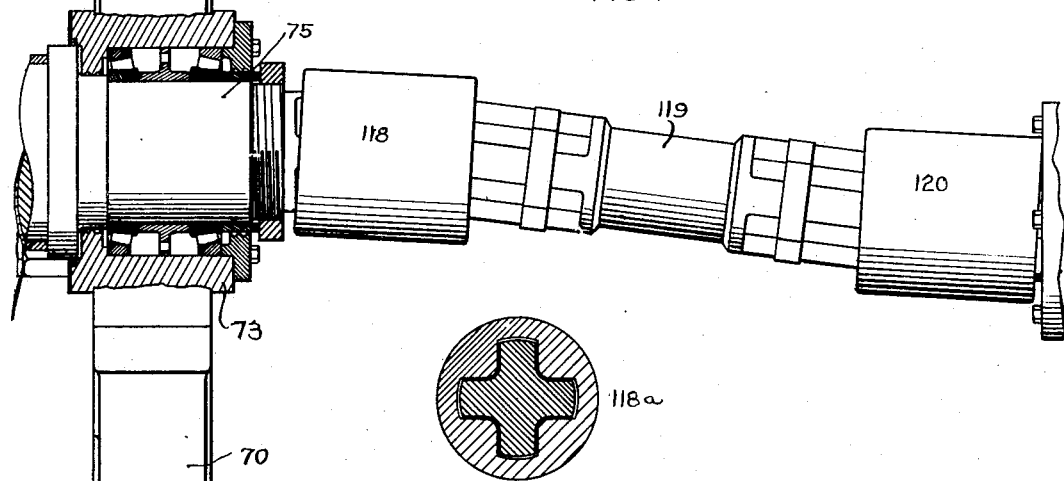
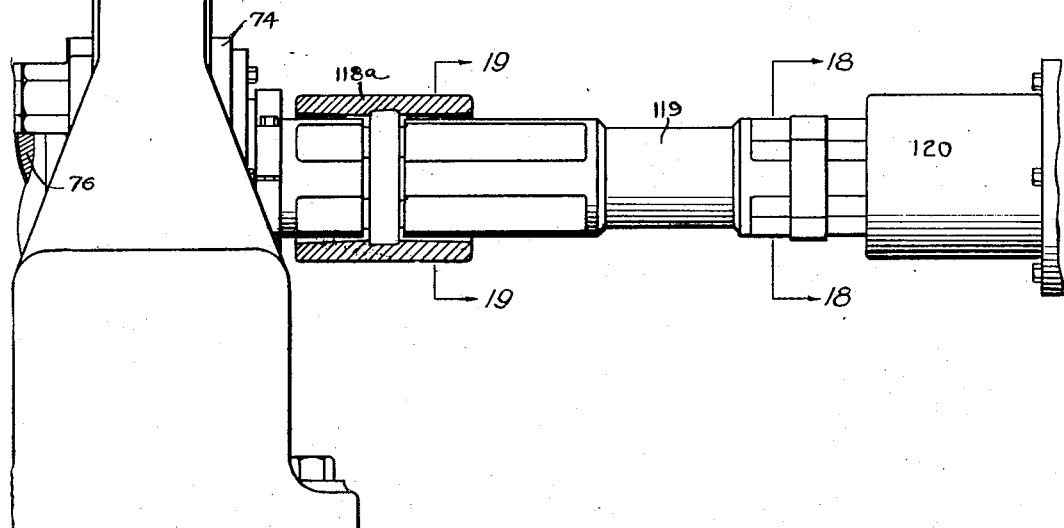
FIG 19
FIG 17
INVENTOR
Carl M. Yoder
BY Geo. B. Pitta
ATTORNEY April 24, 1934.  C. M. YODER  1,955,783
APPARATUS FOR SIZING AND STRAIGHTENING HOLLOW BODIES
Filed Sept. 19, 1931  14 Sheets-Sheet 10

INVENTOR
Carl M. Yoder
BY
Geo. B. Pitts
ATTORNEY

April 24, 1934.  C. M. YODER  1,955,783
APPARATUS FOR SIZING AND STRAIGHTENING HOLLOW BODIES
Filed Sept. 19, 1931  14 Sheets-Sheet 12
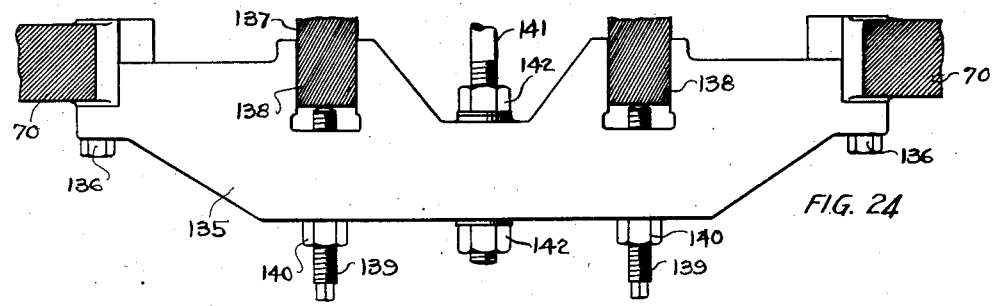
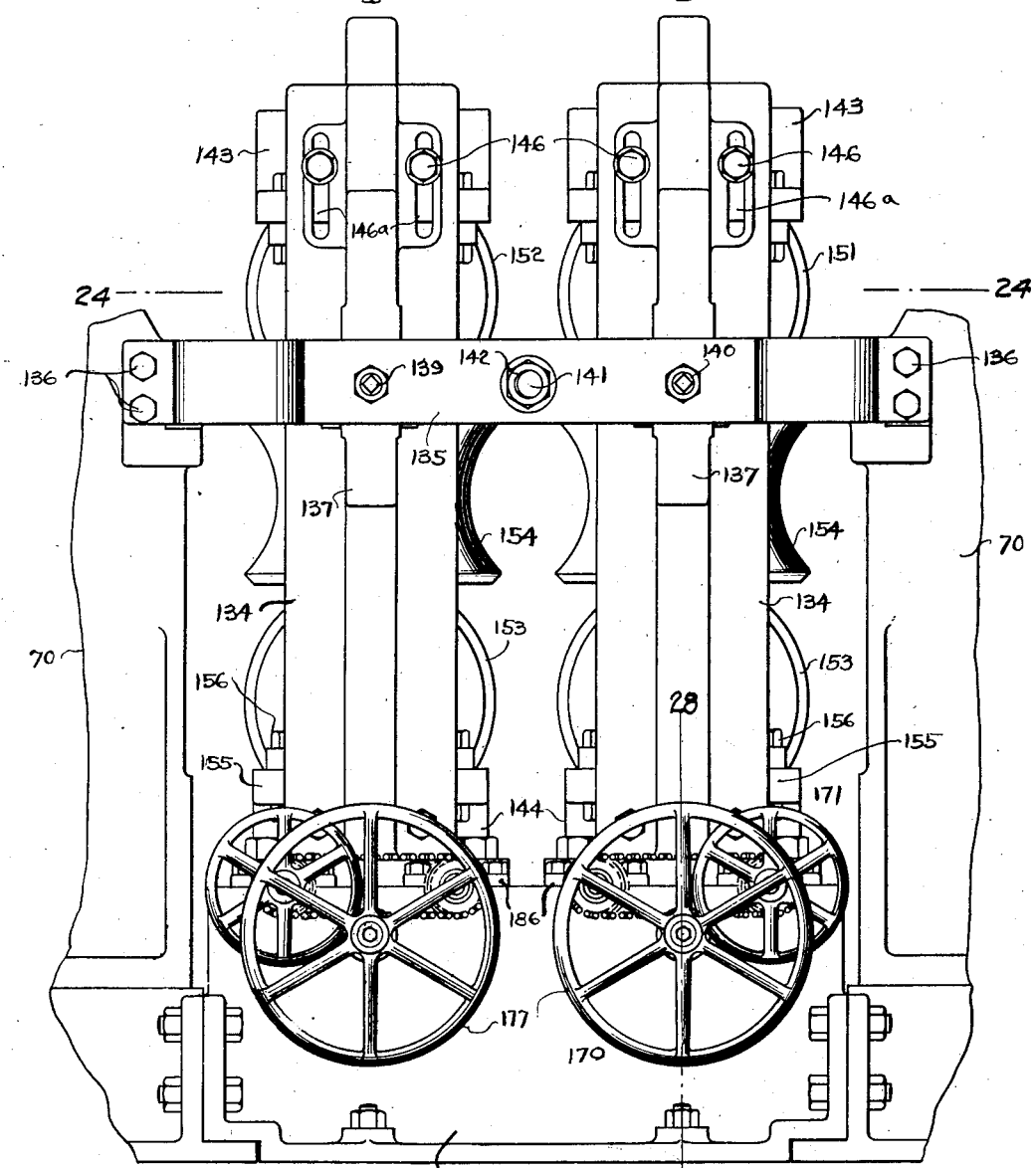
FIG. 23
INVENTOR
Carl M. Yoder
Geo. B. Pitts
BY
ATTORNEY April 24, 1934.　　　　　C. M. YODER　　　　　1,955,783
APPARATUS FOR SIZING AND STRAIGHTENING HOLLOW BODIES
Filed Sept. 19, 1931　　　14 Sheets-Sheet 13

INVENTOR
Carl M. Yoder
BY Geo. B. Fitts
ATTORNEY

April 24, 1934.  C. M. YODER  1,955,783
APPARATUS FOR SIZING AND STRAIGHTENING HOLLOW BODIES
Filed Sept. 19, 1931   14 Sheets-Sheet 14

INVENTOR
Carl M. Yoder
BY Geo. A. Titts
ATTORNEY

Patented Apr. 24, 1934

1,955,783

UNITED STATES PATENT OFFICE 1,955,783

APPARATUS FOR SIZING AND STRAIGHTENING HOLLOW BODIES

Carl M. Yoder, Lakewood, Ohio, assignor of one-half to Harvey O. Yoder, Lakewood, Ohio Application September 19, 1931, Serial No. 563,737

32 Claims. (Cl. 153—54)

This invention relates to apparatus for sizing and straightening hollow bodies of varying shapes in cross section formed from sheet metal or steel plates. The apparatus may be adapted for sizing and straightening hollow bodies of polygon shape in cross section, but the construction herein illustrated is designed to size and straighten hollow bodies of cylindrical shape in cross section, such as tubing and piping. While the apparatus may operate upon formed hollow bodies prior to the welding of the seams thereof, in practice it is preferable to weld such seams before subjecting the bodies to the sizing and straightening operations. The invention herein disclosed has been embodied in an apparatus designed to size and straighten hollow bodies of different sizes and shapes by interchange of rolls and adjustments, namely, sizes ranging approximately from eighteen to thirty six inches in diameter and formed from metal stock having a thickness varying from one-fourth to one inch.

The herein disclosed apparatus may be advantageously used in connection with tube and pipe forming apparatus and welding apparatus such as disclosed in my copending application Ser. No. 486,499 filed October 4, 1930, and is adapted to insure sizing or final shaping of the tubes or pipes and to straightening thereof ready for use.

One object of the invention is to provide an improved apparatus of relatively simple construction and adapted to readily operate upon hollow bodies to straighten them in a rapid manner.

Another object of the invention is to provide an apparatus of the above character in which a hollow body may be passed between adjacent sets of rolls and straightened and sized.

Another object of the invention is to provide apparatus of the above character having a plurality of sets of rolls disposed transversely to the direction of movement of the hollow bodies and co-operative to straighten the bodies to remove therefrom longitudinal curvature.

Another object of the invention is to provide apparatus of the above character having a plurality of sets of rolls disposed transversely to the direction of movement of the hollow bodies and co-operative to size and straighten the bodies to remove therefrom longitudinal curvature and distortions in the walls of the bodies.

Another object of the invention is to construct an apparatus of this character having sets of rolls one or more of which may be separately adjusted to effect cooperative relation between the sets of rolls to remove from hollow bodies longitudinal distortion, bends or curves and bulged or dented portions of the walls thereof.

Another object of the invention is to provide in an apparatus having one or more sets of rolls, an improved mounting for each set of rolls capable of rigidly supporting them in co-operative relation, and permitting ready removal of the rolls.

Another object of the invention is to provide an apparatus having a plurality of sets of rolls capable of engaging the body walls successively to size and straighten the same without danger of subjecting any portion of the body walls to undue stresses.

Another object of the invention is to provide an apparatus for sizing and straightening hollow bodies having a plurality of sets of rolls so arranged that the rearward set or sets of rolls serve as a guide for the body while being acted upon by the forward set or sets of rolls.

Other objects of the invention will be apparent to those skilled in the art to which my invention relates from the following description taken in connection with the accompanying drawings, wherein Fig. 1 is a plan view of an apparatus embodying my invention.

Fig. 2 is a side view enlarged.

Fig. 3 is a plan view of the feeding rolls and their support, somewhat enlarged.

Fig. 4 is a section on the line 4—4 of Fig. 2, parts being in elevation.

Fig. 5 is a fragmentary section on the line 5—5 of Fig. 3.

Fig. 6 is a fragmentary sectional view taken on the line 6—6 of Fig. 5.

Figs. 7 and 8 are sections on the lines 7—7 and 8—8, respectively, of Fig. 4.

Fig. 9 is a section on the line 9—9 of Fig. 4.

Fig. 10 is a plan view of one of the stationary sets of rolls and the driving mechanism therefor.

Figure 1:
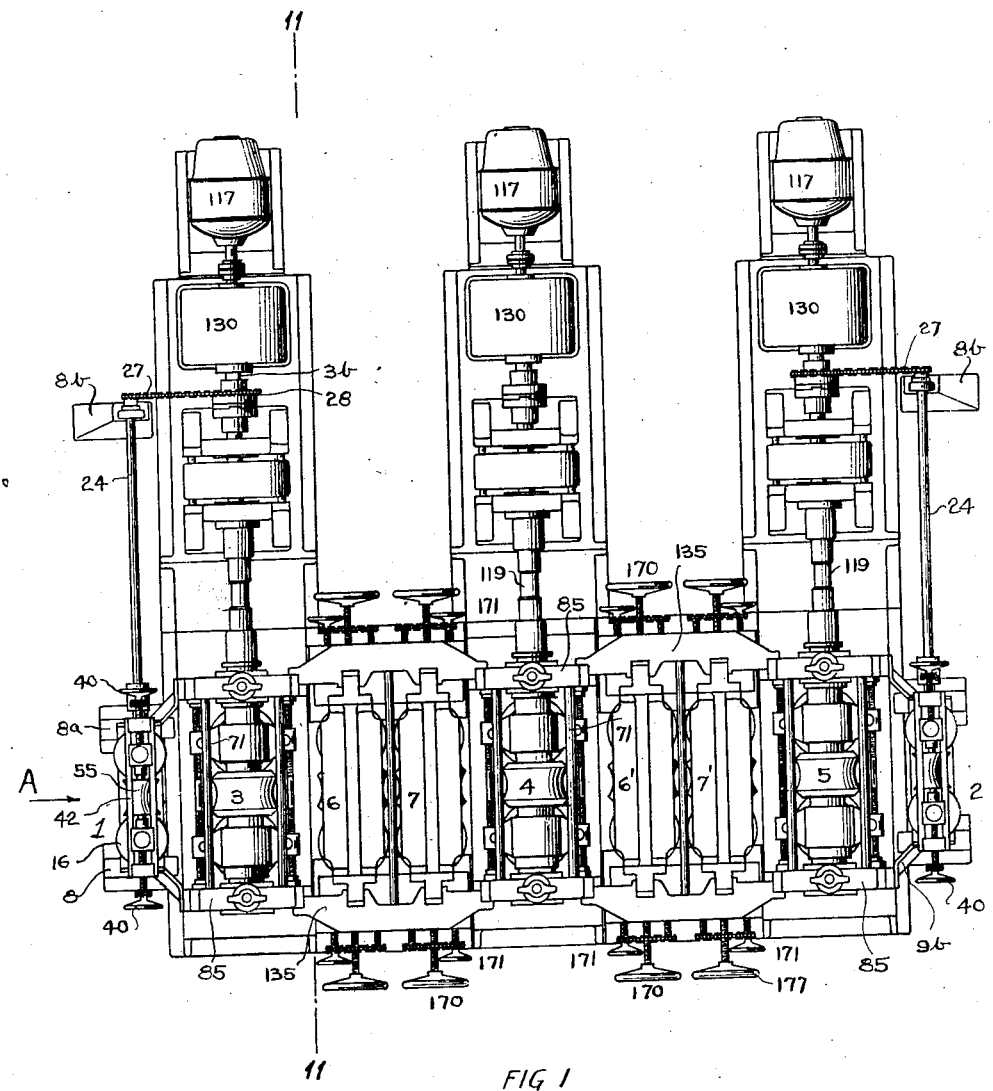

Fig. 11 is an elevation of the parts shown in Fig. 10, being substantially on the line 11—11 of Figs. 1 and 2.

Fig. 12 is an end elevation looking towards the right of Figs. 10 and 11.

Fig. 13 is a section on the line 13—13 of Fig. 12.

Fig. 14 is a fragmentary elevation of parts shown in Figs. 10 and 11, partly in section on the line 14—14 of Fig. 10.

Figure 15:
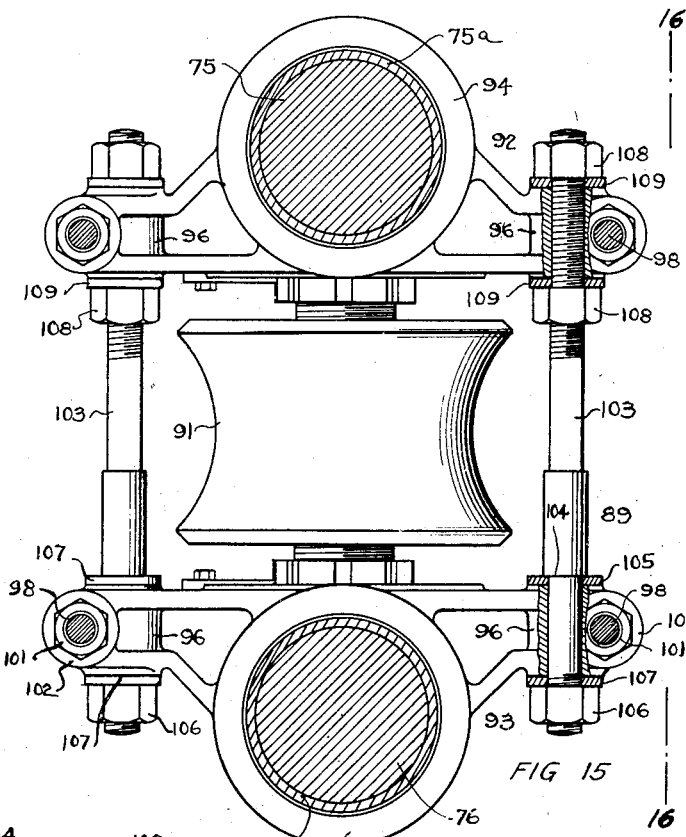

Fig. 15 is a section on the line 15—15 of Fig. 14.

Figure 16:
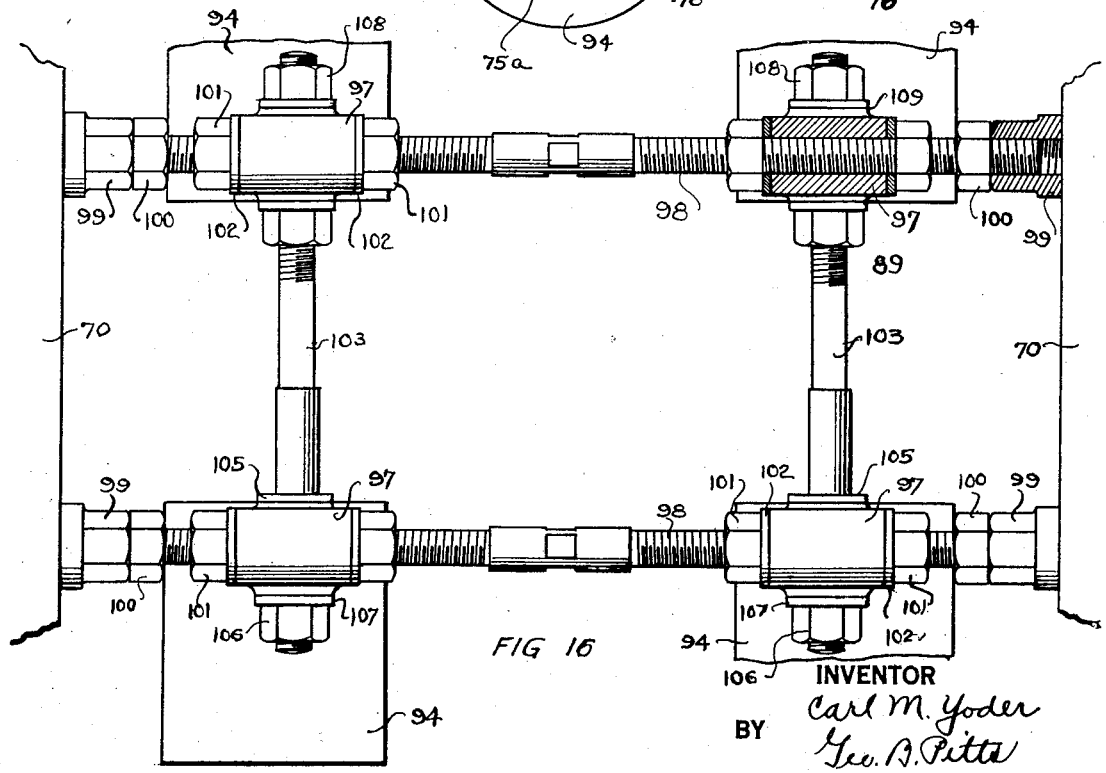

Fig. 16 is an elevation of parts shown in Fig. 11, somewhat enlarged, and substantially on the line 16—16 of Fig. 15 (looking toward the left), parts being in section.

Fig. 16a is a fragmentary section on the line 16a—16a of Fig. 14.

Fig. 17 is a fragmentary view of parts shown in Fig. 11 (somewhat enlarged), parts being in section.

Figs. 18 and 19 are sections on the lines 18—18 and 19—19, respectively, of Fig. 17.

Figure 20:
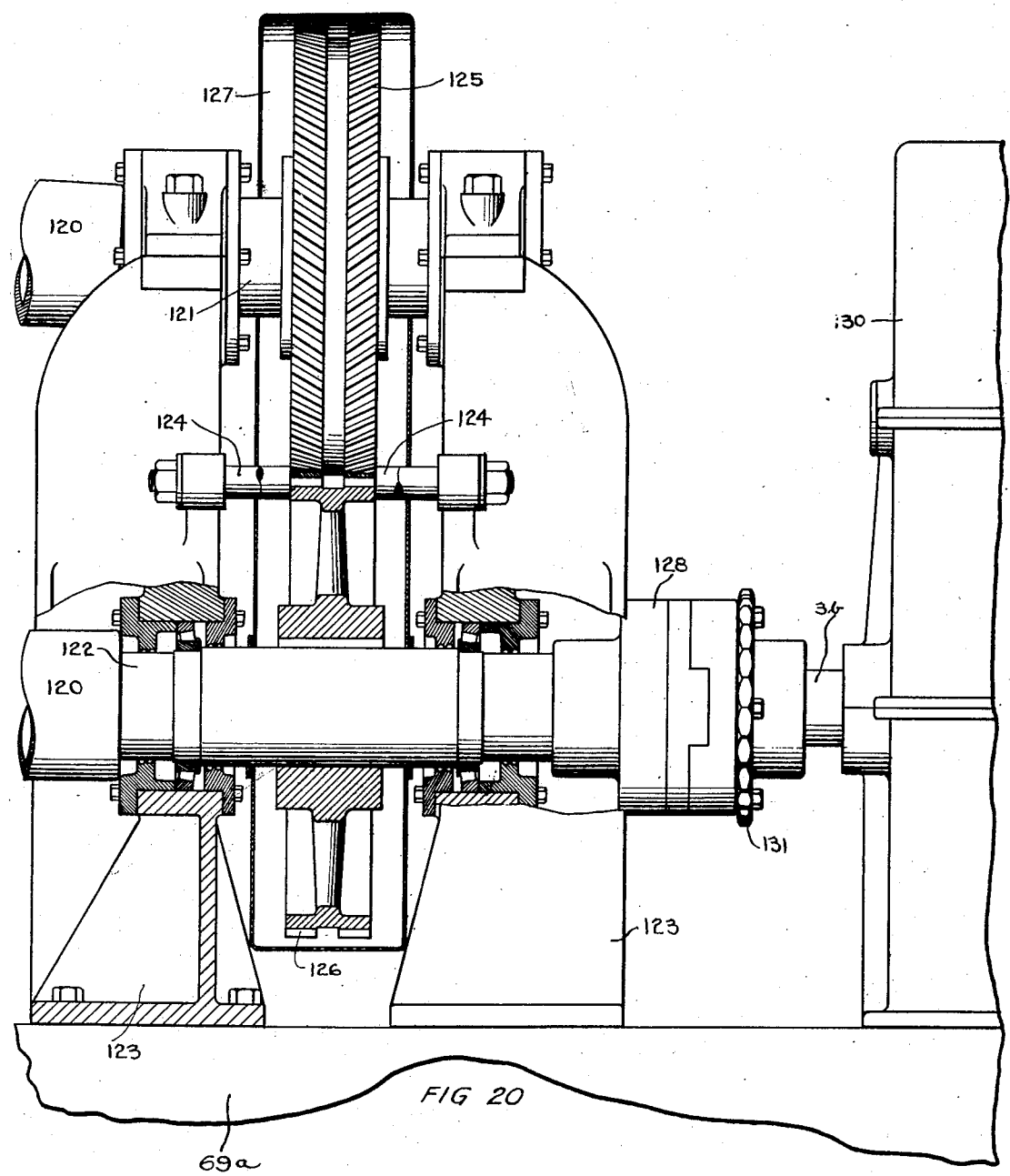

Fig. 20 is a fragmentary view, partly in section on the lines 20—20 and 20a—20a of Fig. 10.

Figure 21:
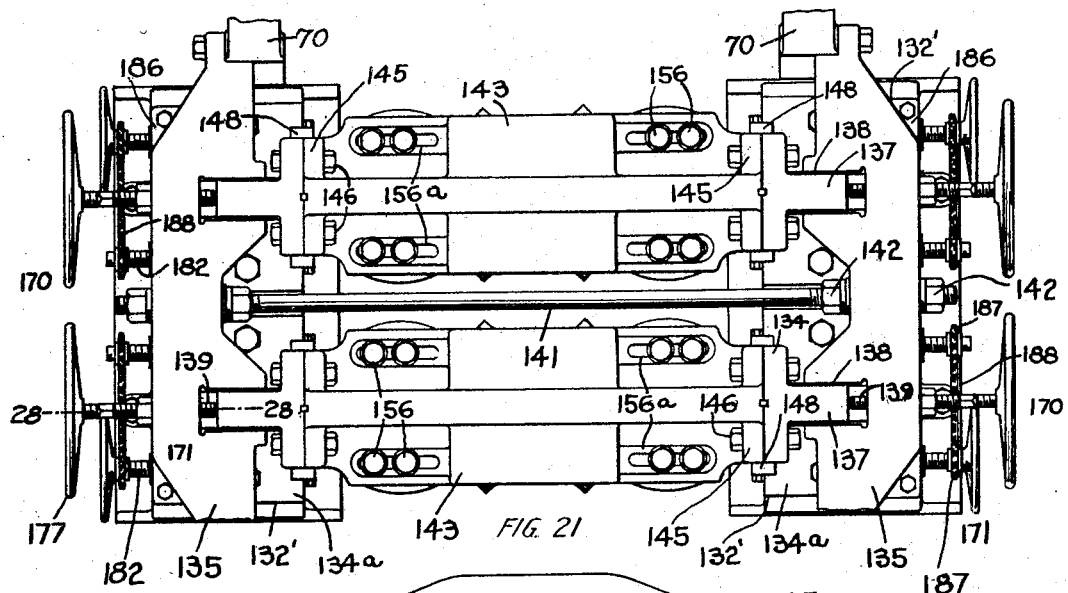

Fig. 21 is a plan view of two sets of rolls.

Figure 22:
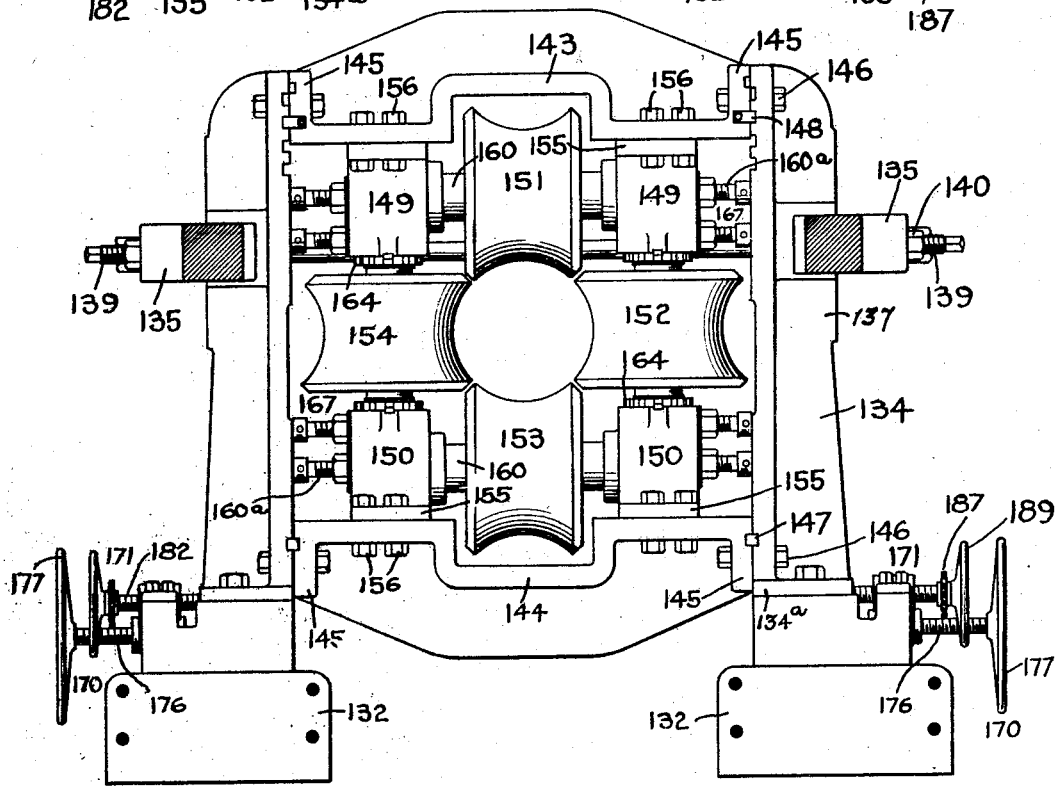

Fig. 22 is an elevational view of the parts shown in Fig. 21.

Fig. 23 is a side elevation of parts shown in Figs. 21 and 22.

Fig. 24 is a section on the line 24—24 of Fig. 23.

Figure 25:
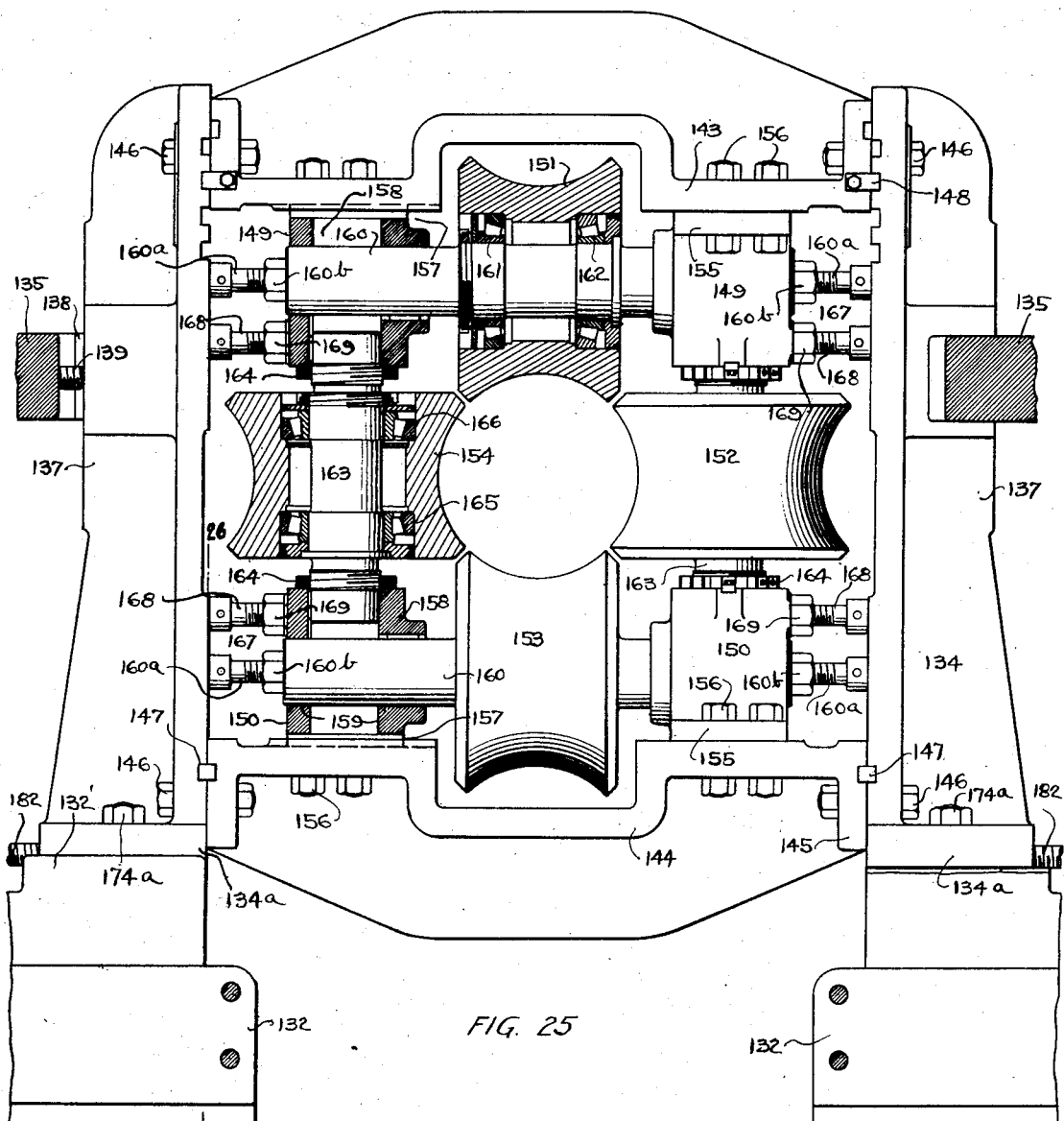

Fig. 25 is a view substantially similar to Fig. 22 (somewhat enlarged), parts being shown in section.

Figure 26:
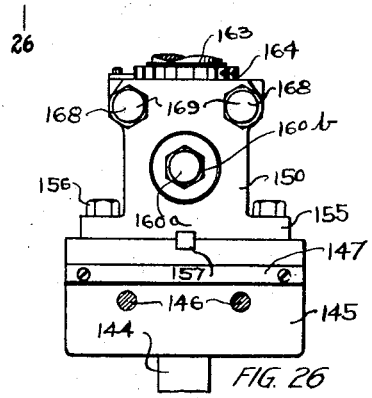

Fig. 26 is a fragmentary view on the line 26—26 of Fig. 25.

Figure 27:
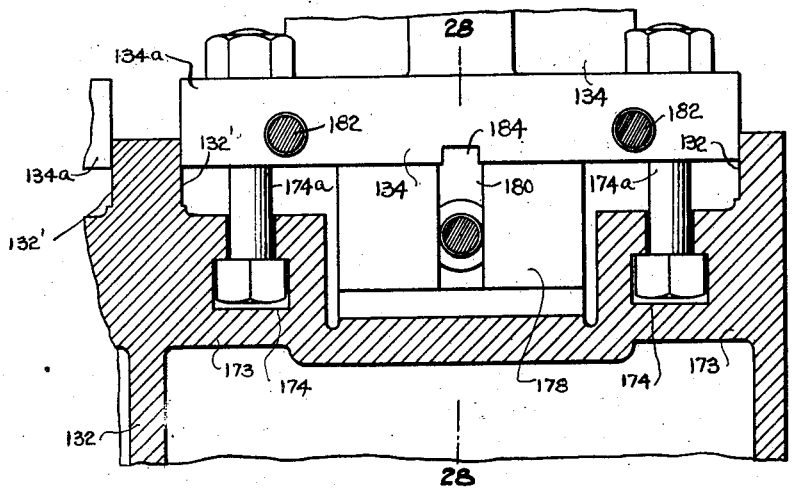
Figure 28:
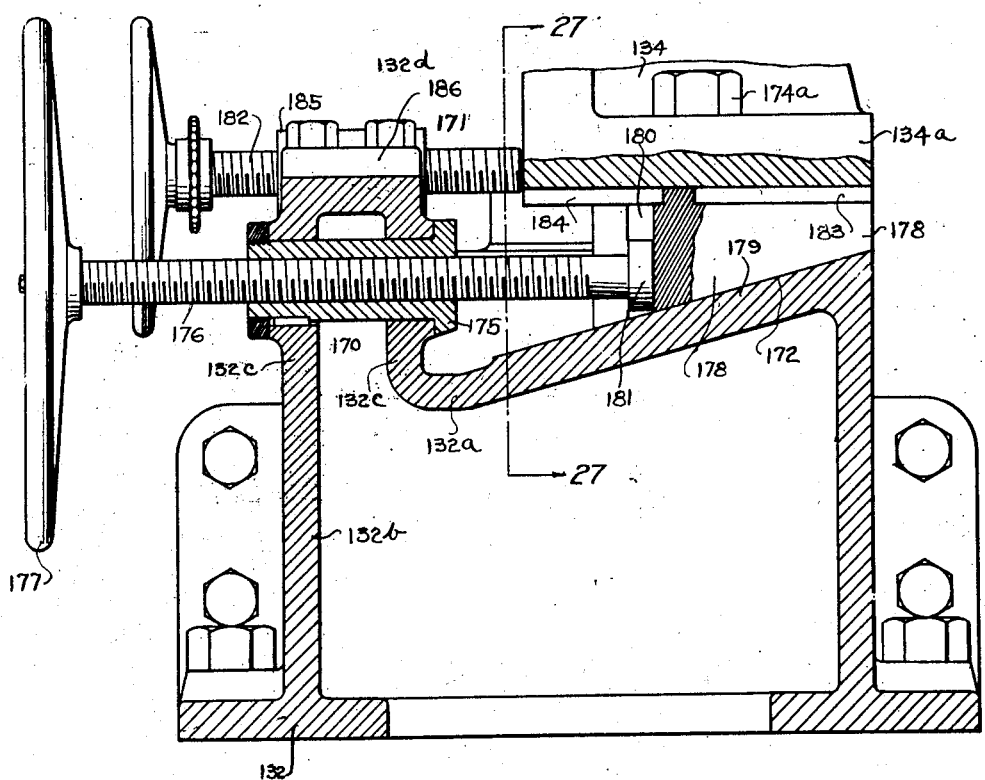

Fig. 27 is a section on the line 27—27 of Fig. 28.

Fig. 28 is a fragmentary section on the line 28—28 of Figs. 21, 23 and 27.

In the drawings, 1 indicates a set of feeding rolls arranged at the front or receiving end of the apparatus. In the present illustrated construction, the feeding rolls 1 are shown associated with the remaining sets of rolls to feed the bodies thereto, but where the sets of sizing and straightening rolls are combined with a body forming apparatus or a welding apparatus, or other apparatus, and such apparatus is provided with delivery rolls, such rolls may constitute or be utilized as the feeding rolls 1 herein. 2 indicates a set of delivery rolls arranged at the rear or delivery end of the apparatus. Between these two sets of rolls I provide one or more main sets of rolls and one or more adjustable sets of rolls. In the illustrated form of construction I have shown three spaced main sets of rolls 3, 4, 5 and between adjoining sets thereof I have shown two independently adjustable sets of rolls designated 6, 7, 6', 7', but when desired a lesser number of sets of rolls may be used, for example, two sets of rolls, at least one of which sets is adjustable. These sets of rolls are mounted, as hereinafter set forth, on bases which are suitably bolted together to form a rigid support.

The delivery rolls 2, the mounting therefor, their adjustment and driving means are preferably identical to the rolls 1, the mounting therefor, their adjustment and driving means, so that the following description will apply to both of these sets of rolls and refer to similar parts: Referring to Figs. 1 to 9, inclusive, 8, 8a, indicate bases arranged to support a casing 9, the latter being secured to the bases by bolts 9a and connected to the standards for the set of rolls 3 by brackets 9b. The casing is open at its upper end and provided on its inner side walls with ledges 10 which form guides and supports for flanges 11 provided on the opposite sides of bearing boxes 12 (only one box being shown), whereby the latter are slidably supported for adjustment on the walls of the casing 9 transversely to the direction of movement of the pipes. The flanges 11 are secured to the ledges 10 by strips 11a, which are bolted to the casing by countersunk cap screws 11b. Each box 12 is internally shaped to provide seats for tapered roller bearings 13, 14, which rotatably support a vertical shaft 15. The shaft 15 has secured to it a side roll 16 (one roll of the set 1). As shown in Fig. 5, the inner race of the bearing 14 seats against a collar 17, which is held in place by a nut 18 threaded on the lower end portion of the shaft 15. The collar 17 serves to close the lower end of the box 12 and a collar 19 on the shaft 15 serves to close the upper end of the box. The shafts 15 are oppositely driven in a direction to feed each pipe to the set of sizing rolls 3, for which purpose each shaft has secured to its lower end a bevel gear 20 meshing with a bevel gear 21. The gear 21 is splined to a shaft 22, which has bearing in the end walls of the casing 9. The inner end of the shaft 22 is extended and connected through a coupling 23 to a shaft 24, that is supported in a pillow block 25 carried by an auxiliary base 8b. The shaft 25 is provided with a sprocket 26, around which runs a chain 27, the latter being driven by a sprocket 28 fixed to a shaft, which drives the driven rolls of the set 3, as hereinafter set forth.

Each gear 21 is connected by a bracket 29 to the adjacent box 12 so as to move therewith when it is adjusted to maintain driving relation between the gears. For this purpose, the hub of the gear 21 is provided with an annular recess 30 into which projects a lug 31, carried by the bracket 29, so that the gear 21 is free to rotate but is interlocked to the bracket, the latter being rigidly secured to the adjacent box by bolts 32, and cap screws 32a. The lug 31 is formed integral with an arc-shaped piece secured to the bracket 29 by bolts 33. The upper end of the bracket is recessed, as shown at 34, to form a seat the purpose of which will later appear. For adjusting each roll 16 toward or from the other roll, I provide the following elements: 35 indicates a screw having a head 36 bearing against the side wall of the box 12. The head is rotatably mounted in a plate 37, which is suitably secured to the side wall of the box 12. The screw 35 is threaded through a nut 38, suitably mounted in a plate 39, which is bolted to the end walls of the casing 9. The outer end of the screw 35 carries a hand wheel 40, by means of which the screw is rotated, and also a sprocket 41, the purpose of which will later appear. When the screw is rotated in one direction, its head moves the adjacent box 12 inwardly; when the screw is rotated in the opposite direction, its head bears against the plate 37 and moves the box outwardly. The screws 35 and their mountings also serve as abutments to resist outward pressure of the boxes 12 due to the engagement of the rolls 16 with the pipe and accordingly supplement the action of the strips 11a in securing or holding the boxes 12 in adjusted position.

The upper ends of the shafts 15 are tied or connected together to resist bending moments on them by the following means: 42 indicates a frame comprising spaced side channels 43 and end blocks 44 to which the channels are bolted, the blocks being recessed on their opposite sides to receive the channels (see Fig. 7). 45 indicates bearing boxes for bearing rollers 46 (see Fig. 5) on which the reduced upper ends of the shafts 15 rotate. Each box is suitably recessed to receive the rollers and provided with a collar 47 to hold the rollers in place. Each bearing box 45 is held in place on the adjacent shaft against the shoulder formed by the reduced shaft end by a washer 48, held in place by a bolt 49 screwed into the end of the shaft. The sides of the bearing boxes 45 are grooved to receive the channels 43 (see Fig. 8), which grooves serve to support the frame 42 in position. 50 indicates screws threaded through nuts 51, which are suitably mounted in the blocks 44. The free ends of the screws 50 engage the outer end walls of the bearing boxes 45 and serve as abutments to resist outward pressure on the shafts 15. As the screws are carried by the frame 42, it will be seen that they co-act to prevent flexing of the shafts and co-act with the screws 35 to maintain them in a predetermined, adjusted position so that the rolls 16 may positively feed the pipe to the rolls 3. By preference each screw 50 is provided at its outer end with a sprocket 52 for a chain 53 which engages the sprocket 41, so that when the hand wheel 40 is operated both screws 35, 50, are rotated, hence simultaneous adjustment of the bearing boxes at the upper end of each shaft may be effected. For this purpose, both screws have the same pitch, and the sprockets 41, 52, are of the same size.

Each set of rolls 1 and 2 includes lower and upper rolls 54, 55, which co-act with the side rolls 16 to prevent distortion of the pipe as it passes between the latter. The roll 54 loosely rotates on a shaft 56. The opposite end portions of the shaft 56 are supported in the seats 34 (see Fig. 6), the opposite sides of each end portion being flattened as shown at 57 and engage the side walls of the seat to prevent rotation of the shaft. Each end portion of the shaft is formed with a diametrical threaded opening 58 for a bolt 59, which may be rotated to project its lower end any desired distance through and beyond the lower side of the shaft 56 to adjust the latter vertically in its seat. When adjusted, the bolt is locked by a nut 60. The upper roll 55 loosely rotates on a shaft 61, the opposite ends of which are seated in hollow bosses 62 provided on the inner sides of collars 63, the shaft being keyed in each boss by a key 61a. Each collar 63 is supported between the flanges 64 of a pair of related rings 65, 65, which are preferably keyed to the adjacent shaft 16 by the same key that secures the adjacent roll 16 thereto, to rotate therewith. The walls of the rings 65 and flanges 64 are provided with bushings to form a bearing for the inner wall of the collar 63. The rings 65 rest on the upper end of the adjacent roll 16 and are held thereon by a collar 66 threaded on the shaft 15 (see Fig. 5). The collar 66 is preferably split so that a clamping bolt 67 may be utilized to lock the collar to the shaft. By interposing shims 68 between the rolls 16 and the rings 65, the shaft 61 may be adjusted vertically to position the roll 55 in the desired relation to the rolls 16. The ends of the shaft 56 clear the walls of the boxes 12 and the ends of the shaft 61 clear the side walls of the rings 65 to permit of transverse adjustment of the shafts 15, as already set forth.

The main sets of rolls 3, 4 and 5, the mountings and the drive means for each set are preferably similar in construction, so that the following description of one set, its mounting and driving means will suffice for the remaining sets. Referring to Figs. 10 to 20, inclusive, 69, 69a, 69b, indicate a plurality of bases suitably secured together and forming a support for the mounting for the set of rolls 3, and the driving means therefor. 70, 70, indicate spaced standards mounted on the base 69 and preferably braced by a pair of rods 71. The standards 70 are formed with openings 72 in which are mounted pairs of upper and lower bearing boxes 73, 74, for supporting upper and lower shafts 75, 76, the upper and lower rolls (designated 77, 78) of the set 3 being keyed to these shafts as shown at 77a in Fig. 14. The opposite vertical sides of the boxes 73, 74, are flanged at 73a along their edges which flanges engage the opposite faces of the standards to prevent lateral movement of the boxes, that is, movement endwise of the shafts 75, 76. The lower pair of boxes 74 rest upon the bottoms of the openings 72. Each upper box 73 is supported on and secured to the adjacent lower box as follows: 79 indicates a hollow, conical shaped member having an elongated base portion bolted to the box 74, as shown in Fig. 12. The inner wall of the member 79 is threaded to receive a jack screw 80. The head of the jack screw supports an anti-friction thrust bearing 81 on which the box 73 is supported. 82 indicates a plate secured to the upper wall of the box 73 and engaged by a screw 83. The screw 83 is threaded through a nut 84, which is mounted in an opening formed centrally in a bridge member 85 extending across the upper ends of the standards 70, the lower end of the nut having a flange which is secured to the lower side of the bridge member by bolts (see Fig. 12). The screw 83 is locked in position by a jam nut 86. As will be understood from Figs. 12 and 13, the jack screw 80 is adjusted to position the shaft 75 at the desired relation to the shaft 76, after which the screw 83 is tightened to rigidly secure the box 74, member 79, screw 80, box 73 and screw 83 together between the bottom of the adjacent opening 72 and adjacent bridge member 85. The upper ends of each standard 70 are provided with projecting pins 87, which extend through openings formed in the end portions of the bridge member 85. The free ends of the pins 87 are threaded to take nuts 88, which clamp the adjacent bridge member to the standard. By preference, the rods 71 are connected to the bridge members 85 and act therethrough to brace the standards 70. The rolls 77, 78, are held in aligned relation substantially centrally between the standards 70 by removable spacing sleeves 75a surrounding the end portions of the shafts. The inner sleeve on each shaft (that sleeve at the right side of each roll 77, 78, as viewed in Fig. 14) engages at its inner end a collar 75b provided on the shaft, whereas the outer end of the outer sleeve is engaged by a nut or ring 75b' threaded on the adjacent portion of the shaft (see Fig. 14). The ring 75b', when tightened, secures the inner sleeve against the collar 75b, the roll 77 against the inner sleeve and the outer sleeve against the roll. The ring 75b' is preferably split so that it may be suitably locked in position. By substituting sleeves 75a of the desired length, each roll 77, 78, may be positioned in aligned relation to each other and other rolls of the apparatus.

89 indicates as an entirety a combined bracing and supporting means for each set of rolls 3, 4, 5, each said means engaging the adjacent roll shafts 75, 76, and the adjacent standards 70 and serving to prevent flexing or distortion of these shafts and cooperate with the supporting and clamping devices for the boxes 73, 74, to maintain the shafts 75, 76, parallel, to hold the rolls in a predetermined spaced relation and to support a pair of side rolls (designated 90, 91) of the set 3 in a predetermined relation to the rolls 77, 78. Of these means, 92, 93, indicate pairs of upper and lower truss members each shaped to provide a centrally arranged integral collar 94, which rotatably fits one end portion of the adjacent shaft 75 or 76. Each collar is provided internally with a bushing 95 which forms a bearing for the adjacent spacing sleeve 75a. As shown in Figs. 14 and 15, the truss members 92 are mounted at opposite sides of the roll 77, and disposed transversely of the shaft 75 and the truss members 93 are similarly disposed at opposite sides of the roll 78; also, that the free ends of the truss members 92, 93, are connected to each other and the standards 70 in the following manner: 96, 97, indicate tubular members provided on the free ends of each truss member, those on one end being similarly arranged to those on the other end and formed integrally with the end portions of said truss member and with each other. As shown in Figs. 14, 15 and 16, (a) the tubular members 96 on each truss member extend vertically and align with the corresponding tubular members on the adjacent truss member of the other pair, and (b) the tubular members 97 on each truss member extend horizontally and align with the corresponding tubular members on the truss member on the other side of the adjacent roll. 98 indicates a horizontal brace rod extending through each two aligned tubular members 97 and connected thereto and removably connected at its ends to the standards 70. The connections at the ends of each brace rod are provided by making the rod slightly shorter than the distance between the opposed faces of the standards 70 and threading on the ends of the rod nipples 99 and then tightening the nipples into engagement with the standards. By preference the threads on one end of the rod are right hand and those on the other end are left hand threads, and in assembly of the rod the nipples 99 are first rotated to adjust them into frictional engagement with the standards and then the rod 98 is rotated in the proper direction to cause a separation of the nipples relative to each other, thereby forcing them into rigid engagement with the standards, the effect of which is to support the rod and brace the parts connected to it, the extension of the rod through the tubular members 97 serving to prevent flexing thereof. As shown, the central portion of the rod 98 is provided with tool engaging elements, whereby the rod may be readily turned. The side walls of the nipples may be of polygon shape to receive a tool in the event it is found necessary to positively hold the nipples against turning during rotation of the rod 98. The nipples 99 and rod 98 are locked against turning by jam nuts 100. Nuts 101 threaded on each end portion of the rod 98 and tightened against the opposite end walls of each tubular member 97 or interposed washers 102 serve as means to connect each said tubular member to the rod 98. 103 indicates a vertical brace rod extending through each two aligned tubular members 96 and connected thereto in the following manner: the intermediate portion of each rod 103 is enlarged to form a shoulder 104 which engages a washer 105 seated against the upper end wall of the tubular member 96 on the adjacent lower truss member 93. The lower free end of the adjacent brace rod 103 is threaded to receive a nut 106, which is tightened against the lower end wall of the tubular member 96 or an interposed washer 107, the nut 106 co-operating with the shoulder 104 to secure the rod 103 to the adjacent tubular member 96. Nuts 108 threaded on the upper end portion of each rod 103 and tightened against the end walls of the adjacent tubular member 96, or interposed washers 109, serve as means to connect each rod 103 and the tubular member 96 of the adjacent truss member 92 together. It will be noted that the connections between the brace rods 98 and the standards may be loosened to permit adjustment of the rods; also, the connections betweens the brace rods 98 and tubular members 97 permit adjustment of the truss members laterally in either direction; and also, the connections between the upper end portions of the brace rods 103 and the tubular members 96 provided on the truss members 92 permit the adjustment of the shaft 75 upwardly or downwardly, the connections between the lower end portions of the rods 103 and tubular members 96 on the truss members 93 preferably not providing for adjustment for the reason that the bearing boxes 74 for the shaft 76 remain stationary in the openings 72.

110, 110, indicate vertical shafts for supporting the side rolls 90, 91. Both rolls are supported on their shafts in the same manner. The upper and lower ends of each shaft fit into aligned recesses 111 formed in the opposed portions of the annular members 94 at one side of the rolls 77, 78, one end of the shaft (preferably its lower end) being suitably keyed to the wall of the adjacent recess 111 (see Fig. 14). The recesses 111 are arranged to support the shafts 110 with their axes in the planes of the axes of the shafts 75, 76. The opposite end portions of the shaft 110 are threaded to support adjustable collars 112, which are clamped or screwed against the adjacent walls of the annular members 94 and co-operate with each other to rigidly secure the shaft thereto.

Each side roll 90, 91, is supported on the adjacent shaft 110 by upper and lower taper roller bearings. For this purpose, the shaft is provided with an annular rib 113 on which seats an annular device 114 to support the inner race of the lower bearing, the outer race being seated in an annular recess 115 formed in the internal wall of the roller. The parts of the upper bearing are similarly constructed except that the element carried by the shaft consists of a threaded ring 116 removably engaging the adjacent threaded end portion of the shaft and co-operating with the rib 113 to hold the bearing parts in assembled relation, whereby the roll 90 is rotatably supported on the shaft.

From the foregoing description it will be seen that the bracing and supporting means 89 serve to securely support the side rolls with their axes in a plane cutting the axes of the rolls 77, 78, and to tie the shafts for the latter rolls together in such manner that all of the rolls may be supported in a fixed or predetermined relation to effectively and simultaneously engage the walls of the pipe along a circumferential line as it feeds through the rolls, to size it and remove bulged or dented portions. It will also be seen that (a) the brace rods 103 extend through vertical aligned tubular members and (b) the truss members are held against movement by the connection of the brace members 98 with the standards 70, the purpose being to overcome danger of the truss members 92, 93, rocking on the shafts 75, 76, and swinging the shafts 110 and moving the rolls 90, 91, into an abnormal position.

From the foregoing description it will be understood that the elements of the combined bracing and supporting means 89 are removable and adjustable, so that the shafts for the rolls 77, 90, 91 may be adjusted or the assembly constituting each set of rolls 3, 4, 5, may be removed in part or entirely where different sizes of rolls are to be employed.

The shafts 75, 76, are preferably driven by a motor 117 (preferably an electric motor). For this purpose, these shafts are extended at their inner ends and connected by couplings 118, 118a, to shaft sections 119, which in turn are connected through couplings 120 to shafts 121, 122. The couplings 118, 120, permit adjustment of the shaft 119 to compensate for adjustment of the shaft 75. The shafts 121, 122, are suitably supported in bearings provided in spaced sectional, upright hangers 123, carried by the base 69a. The hangers 123 are connected at or near their upper portions by rods 124. The shafts 121, 122, have secured to them gears 125, 126, respectively, in mesh, whereby one shaft (preferably the lower shaft) drives the other shaft. The gears 125, 126, are preferably enclosed in a casing 127. The lower shaft 122 extends beyond the outer hanger 123 and is connected through a coupling 128 to the driven shaft 3b. The shaft 3b is driven through a suitable gear reduction, within a casing 130 by the shaft of the motor 117. The gear reduction is preferably similar in construction to the gear reduction shown in my aforesaid co-pending application Ser. No. 486,499. Each of the couplings 118, 118a, 120, 120, is preferably similar in construction to the coupling shown in my aforesaid application.

131 indicates a sprocket engaged by the chain 27 and preferably fixed to one element of the coupling 128 to provide power for driving the adjacent shaft 24. As shown in Fig. 1, the sprocket 131 is not required on the shaft 3b for the set of rolls 4.

The adjustable sets of rolls 6, 7, 6', 7', are similar in construction so that a description of one set will suffice for each of the remaining sets. I preferably mount the sets 6, 7, on spaced bases 132 and the sets 6', 7', on spaced bases 133. Each of said sets of rolls is mounted between a spaced pair of aligned standards 134, 134, the standards for the sets 6, 7, being adjustably secured to the bases 132 and the standards for the sets 6', 7', being adjustably secured to the bases 133. Each standard is provided with a base portion 134a which is mounted, as hereinafter set forth, to provide for horizontal and vertical adjustment of the standard. The upper portions of the adjacent standards of adjoining pairs thereof are engaged by a connector 135, which is rigidly secured at its opposite ends to the standards 70 for the adjoining sets of rolls 3, 4, or 4, 5, by bolts 136, and which serves to resist lateral thrusts on the standards. Each standard 134 is provided on its outer wall with a longitudinally extending reinforcing rib 137, which slidably fits a recess 138 formed in the adjacent connector 135. The connector 135 is formed with threaded through openings each in line with a recess 138, and a screw 139 is threaded through each opening and is adjusted into engagement with the adjacent rib 137 to form an abutment for the standard 134 to hold it in a predetermined position against outward thrusts, after it is adjusted; whereas the engagement of the ribs 137 with the side walls of the recesses 138 locks the standard against twisting or movement in a direction longitudinally of the apparatus. The screws 139 are locked in adjusted position by jam nuts 140. It will be noted that the connectors 135 are disposed in a plane above the pipe sections as the latter make the passes between or through the sets of rolls and substantially in the plane of the upper shaft 160. Accordingly the lateral thrusts imparted by the side rolls on their supporting standards are exerted either directly against the connectors or at points between them and the supporting means for the standards. The connectors 135 are preferably connected together by rods 141, the ends thereof extending through the connectors and provided with nuts 142 which are tightened against the opposite side faces of the connectors.

143, 144, indicate upper and lower horizontal supports having at their opposite ends feet 145 which are rigidly secured to the inner faces of the adjacent pair of standards 134, by bolts 146. The openings in the standards 134 for the bolts 146 which secure the support 143 in position are elongated, as shown at 146a (Fig. 23) to permit of the adjustment hereinafter referred to. The faces of the feet 145 for the support 144 and standards 134 are formed with key ways for a key 147, which insures the assembly of the support in a predetermined position. The faces of the feet 145 for the support 143 and standards 134 are formed with a plurality of key ways certain of which may be aligned to receive a removable key 148 to permit of adjustment of the support 143 to accommodate sets of rolls of different sizes, according to the diameter of the pipe to be straightened.

149, 149, indicate an upper pair of bearing blocks and 150, 150, indicate a lower pair of bearing blocks for supporting the shafts for rolls 151, 152, 153, 154, which constitute one of the adjustable sets of rolls 6, 7, 6', 7'. Each block 149, 150, is provided with flanges 155, which are adjustably secured to the adjacent support 143, 144, by bolts 156. The openings in each support 143, 144, for the bolts 156 are elongated, as shown at 156a (Fig. 21), to permit of adjustment of the bearing blocks. Each block and the adjacent portion of the support is formed with transverse keyways to receive a key 157 (Fig. 26) which aligns each block with the other block of the pair and guides it transversely when the block is adjusted. Each block is preferably formed with a round vertical opening 158 through it for a purpose to be referred to later, and the side walls of the block are formed with aligned openings 159 into which fits one outer end of a shaft 160, the other end of the shaft being similarly supported by the opposite block. As shown in Fig. 25, one end of each shaft 160 is keyed in one opening 159 of the adjacent bearing block. One shaft 160 supports the roll 151 and the other shaft 160 supports the roll 153. Each shaft 160 is provided with sets of taper roller bearings 161, 162, on which the adjacent roll 151 or 153 rotates. The elements of these bearings are preferably mounted on or between the shaft and roll similarly to the mounting of like elements for the rolls 90 and 91. Each shaft 160 has threaded into its opposite ends jack screws 160a the heads of which are tightened into engagement with the adjacent standards 134 (see Fig. 25) and hold the shaft against endwise movement to maintain the roll 151 or 153 carried thereby in a fixed relation to the remaining rolls of the set. By adjustment of the jack screws 160a, the adjacent shaft may be moved endwise to adjust the roll carried by it transversely to insure its aligned relation with the remaining rolls. The jack screws 160a are locked in adjusted position by jam nuts 160b.

163 indicates shafts for supporting the rolls 152, 154. Each shaft 163 has its ends mounted in the openings 158 of adjoining upper and lower blocks 149, 150, and its end portions are threaded to take adjusting rings 164 which are screwed into engagement with the blocks to secure the shaft thereto. The ends of the shaft are keyed to the walls of the openings 158 to prevent rotation of the shaft. By adjustment of the rings 164 on the adjacent shaft 163, the latter may be adjusted endwise to raise or lower the roll carried by it. Each shaft 163 is provided with sets of taper roller bearings 165, 166, on which the adjacent roll 152 or 154 rotates. The elements of these bearings are preferably mounted on and between the shaft and roll similarly to the mounting of like elements for the rolls 90 and 91.

167 indicates as an entirety reinforcing means between the bearing blocks 149, 150, and the standards 134, serving to take loads or strains imparted by the side rolls 152, 154, on the shafts 163 and blocks and to prevent undue strains on the supports 143, 144. The reinforcing means 167 are interposed between each bearing block and the adjacent standard. Each reinforcing means preferably comprises a pair of jack screws 168 interposed between the block and standard and disposed inwardly of the adjacent shaft 160 and upon opposite sides of a vertical plane cutting the axis of the shaft. The jack screws 168 may be threaded into the block and adjusted to tighten their heads against the standard and each locked in such position by a jam nut 169.

In the arrangement disclosed, each pair of jack screws 168 engages the adjacent block 149, 150, at or near its inner end, and accordingly is in position to adequately resist the side thrusts on the shaft 163. As these screws are disposed upon opposite sides of the transverse vertical plane in which the shafts 163 are mounted, tendency of the thrusts on the side rolls to twist the blocks 149, 150, is minimized.

170 indicates as an entirety means for adjusting each standard 134 vertically and 171 indicates as an entirety means for adjusting each standard 134 transversely or toward the other aligned standard. Of the vertical adjusting means 170, 172 indicates inclined walls provided on each base 132, 133, one wall for each standard 134 mounted thereon. The walls 172 are provided in the top wall 132a of each base between thickened portions 173, in which inverted T-shaped slots 174 are formed to slidably receive the heads of bolts 174a (see Fig. 27). The top wall 132a and outer side 132b of the base are shaped to provide vertical portions 132c in which is mounted a nut 175 into and through which is threaded a screw 176 adapted to be operated by a hand wheel 177. 178 indicates a slide having a horizontal upper surface on which the base portion 134a of the adjacent standard is adjustably mounted and an inclined lower surface 179 having an inclination to the horizontal similar to the wall 172. The outer end of the slide 178 is formed with a vertically extending T-shaped slot 180 into which rotatably fits a head 181 on the inner end of the screw 176, so that by operation of the screw the slide may be moved inwardly or outwardly. When such operation of the slide is effected, the bolts 174a and screws 139 are loosened, and also adjusting screws 182 of the adjusting means 171 are loosened sufficiently to permit vertical adjustment of the standards 134, but the latter screws are utilized to prevent transverse movement of the standards while vertical adjustment is being made. The top surface of each slide 178 is provided with a rib 183 which fits into a correspondingly shaped groove 184 formed in the bottom or base portion 134a of the adjacent standard 134, the walls thereof serving as a guide for the slide.

The transverse adjusting means 171 comprise pairs of screws 182 (already referred to) threaded through nuts 185, which are suitably mounted on the base walls 132d by plates 186, and guide walls 132' on the bases 132, 133, which walls engage the opposite sides of the base portions 134a, as shown in Fig. 27. I provide one pair of screws 182 for each standard 134. The screws 182 of each pair are tightened against the outer end portions of the standard 134 and co-operate with the pair of screws for the other aligned standard to hold the standards and the set of rolls mounted between them in a predetermined position. Upon loosening the bolts 174a and screws 139, the pairs of screws 182 for each two aligned standards may be rotated to adjust the latter transversely on the slides 178. Following such adjustment, the bolts 174a, screws 139 and screws 182 may be tightened to rigidly secure the standards 134 in position.

The screws 182 for adjusting each standard 134 are provided at their outer ends with sprockets 187, which are engaged by a chain 188, and the free end of one screw 182 carries a hand wheel 189, so that both screws 182 for adjusting each standard may be rotated simultaneously. As the sprockets 187 are similar in size and the screws 182 have the same pitch, operation of the wheel 189 will move the adjacent aligned standards transversely between their guides 132'. In making either adjustment of each pair of aligned standards 134, it will be noted that they and the set of rolls carried by them are moved as a unit.

In the preferred operation of my apparatus the pipes or cylindrical bodies are passed therethrough in the direction of the arrow A (Figs. 1 and 2). Each pipe is first engaged by the feeding rolls 1, which direct it to the adjacent rolls 3. The pipe then makes the pass between the rolls 3, and rolls 6, 7, rolls 4, rolls 6', 7', and final set of rolls 5; the pipe is then engaged by the driven delivery rolls. As the sets of rolls 6, 7, 6', 7', are independently adjustable transversely and vertically, they may be positioned for co-action with each other and/or the rolls 3, 4, 5 to remove bends or curvature in any direction longitudinally of the pipe and distortion, bulges or indentations in its walls.

It will be noted that (a) the rolls of each set are co-operative to size the pipe and to remove from the walls thereof bulged and dented portions, since the rolls of each set are disposed in a transverse plane and simultaneously engage the pipe throughout its circumference and (b) adjacent sets of rolls are co-operative to effect straightening of the pipe to remove therefrom longitudinal curvature. As adjacent sets are relatively adjustable transversely and vertically, the pipe may be straightened to remove longitudinal curvature extending in any direction.

It will be also noted that as each pipe is passed through the sets of rolls the rearward set in engagement with the pipe serves as a guide therefor as it is operated upon by the forward set or sets of rolls, so that in the first instance the set of rolls 1 act as a guide and after the rear pipe end passes beyond such set, the set of rolls 3 act as a guide. Accordingly, the sets (except the sets 7' and 2) act successively as a guide for rear end of the pipe as it passes to and through the final set 7'.

To those skilled in the art to which my invention relates many changes in construction and widely differing embodiments and applications of the invention will suggest themselves without departing from the spirit and scope thereof. My disclosure and the description herein are purely illustrative and are not intended to be in any sense limiting.

What I claim is:

1. In apparatus of the class described, the combination of a plurality of sets of rolls, each set comprising upper and lower opposed rolls and opposed side rolls disposed in the same plane transversely of the direction of movement of a hollow body and co-operative to simultaneously engage the body circumferentially, means for bodily adjusting one of said sets of rolls in a plane at right angles to the movement of the hollow body, said sets of rolls being co-operative to straighten the body, and means for driving certain rolls of one of said sets.

2. In apparatus of the class described, the combination of spaced main sets of rolls, an adjustable set of rolls between said main sets of rolls, each set comprising upper and lower opposed rolls and opposed side rolls disposed in the same plane transversely of the direction of movement of a hollow body and co-operative to simultaneously engage the body circumferentially, means for bodily adjusting said adjustable set of rolls in a plane at right angles to the movement of the hollow body, and means for driving certain rolls of one of said sets.

3. In apparatus of the class described, the combination of spaced main sets of rolls, a separate set of rolls between said main sets of rolls, each set comprising upper and lower opposed rolls and opposed side rolls disposed in the same plane transversely of the direction of movement of a hollow body and co-operative to simultaneously engage the body circumferentially, means for driving certain rolls of one of said sets, and means for bodily adjusting said separate set of rolls vertically.

4. In apparatus of the class described, the combination of spaced main sets of rolls, a pair of rigidly supported standards for supporting each of said sets of rolls, a set of rolls intermediate said main sets of rolls, standards for supporting said last mentioned set of rolls, means for adjustably supporting the last mentioned standards, connectors between adjacent standards for the first mentioned sets of rolls, and adjustable abutments carried by said connectors arranged to engage the standards for the intermediate set of rolls to brace said standards against lateral thrusts.

5. In apparatus of the class described, the combination of spaced main sets of rolls, a pair of rigidly supported standards for supporting each of said sets of rolls, a set of rolls between said main sets of rolls, standards for supporting said last mentioned set of rolls, means for adjustably supporting the last mentioned standards, and connections between the first mentioned standards and the last mentioned standards serving to brace the latter against longitudinal and lateral thrusts, said connections including adjustable abutments to compensate for the adjustment of the last mentioned standards.

6. In apparatus of the class described, the combination of a plurality of spaced sets of sizing rolls, a pair of standards for supporting each said set of rolls, each said set of rolls comprising upper and lower rolls and opposed side rolls disposed in the same plane transversely of the direction of movement of a hollow body and co-operative to simultaneously engage the body circumferentially, means for adjusting the shaft for the upper roll, and means for adjusting endwise the shafts for the opposed side rolls.

7. In apparatus of the class described, the combination of a main set of rolls, an adjustable set of rolls, a set of feeding rolls in front of said sets of rolls, each said set of rolls comprising a pair of upper and lower rolls and a pair of opposed side rolls, means for driving certain of said feeding rolls and means for driving certain of the rolls of one of the other sets of rolls.

8. In apparatus of the class described, the combination of main sets of rolls, a pair of rigidly supported standards for supporting each of said sets of rolls, a set of rolls intermediate said main sets of rolls, standards for supporting said last mentioned set of rolls, means for adjustably supporting the last mentioned standards, connectors between adjacent standards for the first mentioned sets of rolls disposed in a plane above a body when passed through the sets of rolls, and adjustable abutments carried by said connectors and arranged to engage the standards for the intermediate set of rolls to brace said standards against lateral thrusts.

9. In apparatus of the class described, the combination of a pair of standards, upper and lower shafts removably and rotatably mounted therein, rolls fixed to said shafts, pairs of truss members disposed on said shafts at opposite sides of said rolls, vertical shafts supported by and between said truss members in line with the axes of said rolls, rolls on said vertical shafts arranged to engage the side portions of the blank, rigid connections between said truss members, and means for driving said first mentioned shafts.

10. In apparatus of the class described, the combination of a main set of rolls, a second set of rolls comprising a pair of standards, upper and lower rolls and side rolls, a shaft for each roll and means for supporting said shafts between said standards, and devices between the opposite ends of each shaft for the upper and lower rolls and the standards arranged to adjust said shaft endwise and to resist end thrusts thereon.

11. In apparatus of the class described, the combination of a main set of rolls, a second set of rolls comprising a pair of standards, upper and lower supports extending between and secured to said standards, upper and lower pairs of bearing blocks secured to the inner sides of said supports, upper and lower rolls, and a shaft for each said roll having its ends supported in two of said blocks, and reinforcing means between each block and the adjacent standard, said means being adjustable between said standard and block to rigidly support the latter and to transmit lateral pressure upon the block to the standard.

12. In apparatus of the class described, the combination of a set of rolls, a second set of rolls comprising a pair of standards, upper and lower supports extending between and secured to said standards, upper and lower pairs of bearing blocks secured to the inner sides of said supports, upper and lower rolls and side rolls and a shaft for each roll having its ends supported in two of said blocks, and reinforcing means between each block and the adjacent standard, said means being expansible against said standard and block to rigidly support the latter and to transmit lateral pressure upon the block to the standard, said reinforcing means for each block being disposed inwardly of the adjacent upper or lower roll shaft and at opposite sides of the axis of the shaft for the adjacent side roll.

13. In apparatus of the class described, the combination of a pair of standards, upper and lower shafts removably and rotatably mounted therein, rolls fixed to said shafts, pairs of truss members disposed on said shafts at opposite sides of said rolls, vertical shafts supported by and between said truss members in line with the axes of said rolls, rolls on said vertical shafts arranged to engage the side portions of the blank, rigid connections between each truss member and the other truss members of the pair and the adjacent truss member of the other pair thereof, and means for driving said first mentioned shafts.

14. In apparatus of the class described, the combination of a set of rolls, means for driving certain rolls of said set of rolls, a second set of rolls comprising a pair of standards, a lower support secured at its ends to said standards, an upper support adjustably secured at its ends to said standards for movement vertically, upper and lower pairs of bearing blocks adjustably secured to the inner sides of said supports for adjustment transversely, upper and lower rolls and side rolls, and a shaft for each roll having its ends mounted in two of said blocks.

15. In apparatus of the class described, the combination of a set of rolls, a second set of rolls comprising a pair of standards, a lower support secured at its ends to said standards, an upper support adjustably secured at its ends to said standards for movement vertically, upper and lower pairs of bearing blocks adjustably secured to the inner sides of said supports for adjustment transversely, upper and lower rolls and side rolls, a shaft for each roll having its ends mounted in two of said blocks, means between the ends of each shaft for the upper and lower rolls and the standards for adjusting the shaft endwise, and means carried by the shaft for each side roll and engaging the adjacent bearing blocks for adjusting said shaft endwise.

16. In apparatus of the class described, the combination of a pair of standards, bearing boxes mounted in said standards, upper and lower roll shafts supported in said boxes and carrying opposed rolls, upper and lower trusses at either side of said rolls and having collars rotatably fitting said shafts, pairs of horizontal rods rigidly connected to the opposite outer ends of said trusses and rigidly connected at their free ends to said standards.

17. In apparatus of the class described, the combination of a pair of standards, bearing boxes mounted in said standards, upper and lower roll shafts supported in said boxes and carrying opposed rolls, upper and lower trusses at either side of said rolls and having collars rotatably fitting said shafts, horizontally disposed tubular members on the outer ends of said trusses, a rod extending through each member on one truss and the aligned member on the other truss, means for securing each rod to the members through which it extends, and means for securing the outer ends of each rod to said standards.

18. In apparatus of the class described, the combination of a pair of standards, bearing boxes mounted in said standards, upper and lower roll shafts supported in said boxes and carrying opposed rolls, upper and lower trusses at either side of said rolls and having collars rotatably fitting said shafts, horizontally disposed tubular members on the outer ends of said trusses, a rod extending through each member on one truss and the aligned member on the other truss, means for securing each rod to the members through which it extends, and means for securing the outer ends of each rod to said standards, said securing means comprising nipples threaded on the ends of each rod and arranged to be tightened against said standards.

19. In apparatus of the class described, the combination of a pair of standards, bearing boxes mounted in said standards, upper and lower roll shafts supported in said boxes and carrying opposed rolls, upper and lower trusses at either side of said rolls and having collars rotatably fitting said shafts, horizontally disposed tubular members on the outer ends of said trusses, a rod extending through each member on one truss and the aligned member on the other truss, means for securing each rod to the members through which it extends, means for securing the outer ends of each rod to said standards, said securing means comprising nipples threaded on the ends of each rod and arranged to be tightened against said standards, and connections between the outer ends of adjacent upper and lower trusses.

20. In apparatus of the class described, the combination of a pair of standards, upper and lower shafts removably and rotatably mounted therein, rolls fixed to said shafts, pairs of truss members disposed on said shafts at opposite sides of said rolls, vertical shafts supported by and between said truss members in line with the axes of said rolls, rolls on said vertical shafts arranged to engage the side portions of the blank, rigid connections between each truss member and the other truss member of the pair and the adjacent truss member of the other pair thereof, said connections being adjustable, and means for driving said first-mentioned shafts.

21. In apparatus of the class described, the combination of a support, bearing boxes adjustably mounted on said support, a vertical shaft rotatably mounted in each box and carrying a roll, means for rotating said shafts, a horizontal shaft mounted on said bearing boxes and provided with a horizontal roll below said first mentioned rolls, connections between the upper ends of said first mentioned shafts, supports on said shafts above said first mentioned rolls, and a horizontal shaft mounted on said supports and provided with a horizontal roll in opposed relation to said first mentioned horizontal roll.

22. In apparatus of the class described, the combination of a support, bearing boxes adjustably mounted on said support, a vertical shaft rotatably mounted in each box and carrying a roll, means for rotating said shafts, a horizontal shaft mounted on said bearing boxes and provided with a horizontal roll below said first mentioned rolls, connections between the upper ends of said first mentioned shafts, supports on said shafts above said first mentioned rolls, a horizontal shaft mounted on said supports and provided with a horizontal roll in opposed relation to said first mentioned horizontal roll, and means for adjusting the last mentioned horizontal shaft.

23. In apparatus of the class described, the combination of a pair of standards, bearing boxes mounted in said standards, upper and lower roll shafts supported in said boxes and carrying opposed rolls, upper and lower trusses at either side of said rolls and having collars rotatably fitting said shafts, a vertical shaft mounted in said trusses at either side of said rolls, a side roll carried by each vertical shaft, and connections between the outer ends of said trusses and said standards.

24. In apparatus of the class described, the combination of a pair of standards, bearing boxes mounted in said standards, upper and lower roll shafts supported in said boxes and carrying opposed rolls, upper and lower trusses at either side of said rolls and having collars rotatably fitting said shafts, a vertical shaft mounted in said trusses at either side of said rolls, a side roll carried by each vertical shaft, and connections between the outer ends of said trusses and said standards, said connections comprising rods connected to said trusses and devices threaded on the rods and arranged to be tightened against said standards.

25. In apparatus of the class described, the combination of a pair of standards, upper and lower supports extending between and secured to said standards, upper and lower pairs of bearing blocks secured to the inner sides of said supports, upper and lower rolls and side rolls and a shaft for each roll having its ends supported in two of said blocks, and reinforcing means between each block and the adjacent standard.

26. In apparatus of the class described, the combination of a pair of standards, upper and lower supports extending between and secured to said standards, upper and lower pairs of bearing blocks adjustably secured to the inner sides of said supports, upper and lower rolls and side rolls and a shaft for each roll having its ends supported in two of said blocks, and reinforcing means between each block and the adjacent standard.

27. In apparatus of the class described, the combination of a pair of standards, upper and lower supports extending between and secured to said standards, upper and lower pairs of bearing blocks secured to the inner sides of said supports, upper and lower rolls and side rolls and a shaft for each roll having its ends supported in two of said blocks, and reinforcing means between each block and the adjacent standard, said means being expansible against said block and standard to rigidly support the latter and to transmit lateral pressure upon the block to the standard.

28. In apparatus of the class described, the combination of a pair of standards, bearing boxes mounted in said standards, upper and lower roll shafts removably and rotatably supported in said boxes and carrying opposed rolls, upper and lower trusses at either side of said rolls and disposed at right angles to said shafts and having collars rotatably fitting said shafts, and vertical tie rods extending between and rigidly connected to the outer ends of said trusses at opposite sides of said shafts.

29. In apparatus of the class described, the combination of a support, a pair of standards movably mounted on said support, a lower support secured at its ends to said standards, an upper support secured at its ends to said standards, upper and lower pairs of bearing blocks secured to the inner sides of said supports, upper and lower rolls and side rolls, a shaft for each roll having its ends mounted in two of said blocks, and means for adjusting said standards vertically on said support.

30. In apparatus of the class described, the combination of a support, a pair of standards movably mounted on said support, a lower support secured at its ends to said standards, an upper support secured at its ends to said standards, upper and lower pairs of bearing blocks secured to the inner sides of said supports, upper and lower rolls and side rolls, a shaft for each roll having its ends mounted in two of said blocks, and means for adjusting said standards transversely on said support.

31. In apparatus of the class described, the combination of a support, a pair of standards movably mounted on said support, a lower support secured at its ends to said standards, an upper support secured at its ends to said standards, upper and lower pairs of bearing blocks secured to the inner sides of said supports, upper and lower rolls and side rolls, a shaft for each roll having its ends mounted in two of said blocks, means for adjusting said standards transversely on said support, and means for adjusting said standards vertically on said support.

32. In apparatus of the class described, the combination of a pair of spaced standards, upper and lower horizontal shafts mounted in said standards and carrying rolls in opposed relation, supports on said shafts within said standards, vertical shafts carried by said supports in the plane of said upper and lower shafts, and rolls on said vertical shafts in opposed relation.

CARL M. YODER.